Nov. 10, 1970  F. KOVESSI  3,539,891
DOUBLE-FED POLYPHASE CASCADE MACHINES AND A METHOD
OF PRODUCING SUCH MACHINES
Filed Jan. 29, 1968

INVENTOR.
FERENC KÖVESSI
BY Young & Thompson
ATTYS.

United States Patent Office 3,539,891
Patented Nov. 10, 1970

3,539,891
DOUBLE-FED POLYPHASE CASCADE MACHINES AND A METHOD OF PRODUCING SUCH MACHINES
Ferenc Kovessi, Budapest, Hungary, assignor to Villamosipari Kutato Intezet, Budapest, Hungary
Filed Jan. 29, 1968, Ser. No. 701,452
Int. Cl. H02p 7/36
U.S. Cl. 318—197     11 Claims

ABSTRACT OF THE DISCLOSURE

A double-fed polyphase cascade machine is provided with primary and secondary windings. The numbers of poles of the primary windings ($p_1$, $p_3$) are so chosen that they cannot induce any voltage in one another. The iron body of the cascade machine is combined to form a magnetic circuit provided with a single air gap. The primary windings are connected to supply systems, the secondary windings are short-circuited with one another. The number of phases and the number of poles of the secondary windings are so chosen and combined with one another in such a phase sequence that one primary winding induces a voltage into the other primary winding through the secondary windings, and vice versa.

---

The invention relates to a double-fed polyphase cascade machine. Such a common drive—cascade drive—of two asynchronous motors, wherein the shafts are mechanically connected together and the rotors are electrically connected together, is known. The two primary windings may be supplied either from the same supply system or at different frequencies, and in the latter case with a variable frequency for achieving a variable speed.

Although this arrangement has very advantageous properties, it has not been widely adopted since it became known, more than 60 years ago. This is obviously due to the fact that the arrangement comprises a combination of two machines and its dimensions are unfavorable for installation, while the volume of the machines is not well utilized.

The rapid development of the current converter art, more especially in regard to constructions for variable speed, would recommend the use of this type of machine but for the aforesaid disadvantages.

The object of the invention is to provide such an electric machine which obviates the disadvantage of two separate combined machines and which utilises the advantages existing in the tandem machine system.

The underlying idea of the invention is the observation that this may be achieved by constructing the machine with a single magnetic circuit, in which two primary windings having different numbers of poles are employed, and the number of poles of these windings are so chosen, in known manner, that they cannot induce voltages in one another. In addition, a rotor construction of such type as to enable one primary winding to induce a voltage in the other primary winding through the secondary windings, and vice versa, is employed whereby the two commonly acting fields rotating at different speeds which are set up by the two polyphase primary windings are enabled to synchronise the rotor situated between them.

The rotor constantly remains in this synchronous state so that the voltage induced thereby causes an exciting action to be exerted in relation to the primary windings, and the rotor thus opertaes similarly to two synchronous machines.

By reason of the two commonly operating rotating fields, this arrangement may be described as an electric machine having a tandem field.

In accordance with what is stated in the foregoing, the invention resides in combining the two iron bodies of the previously known cascade machines to form a magnetic circuit containing a single air gap. The number of poles of the primary windings are chosen in known manner so that they cannot induce any voltages in one another, and the number of phases and the number of poles of the secondary windings are chosen and combined with one another so that one primary winding induces a voltage in the other primary winding through the secondary windings and vice versa.

Figure 1:
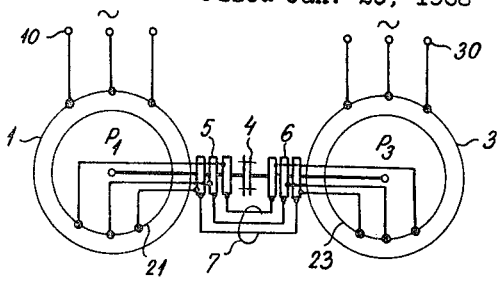
Figure 2:
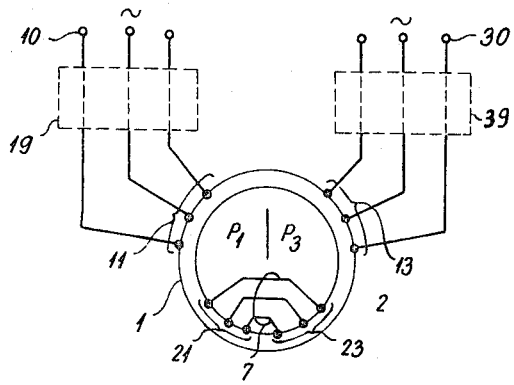
Figure 3:
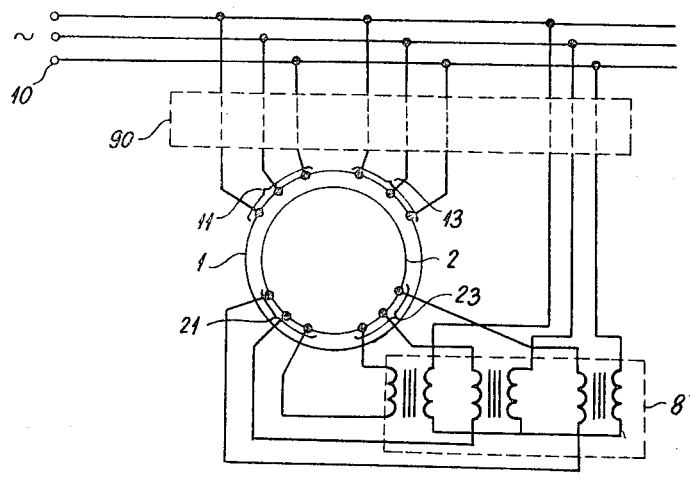

Details of the invention will be discussed with reference to the drawings, in which FIG. 1 is the circuit diagram of an exemplary known double-fed cascade machine having a three-phase current slip-ring rotor, FIG. 2 illustrates by way of example a three-phase circuit arrangement of the cascade machine according to the invention, and FIG. 3 illustrates by way of example the circuit diagram of the three-phase synchronous transformer.

FIG. 1 illustrates the slip-ring construction for a known double-fed three-phase cascade machine, in which the primary winding, situated on the iron body 1, of the front motor is connected to the supply system 10, and the primary winding, situated on the iron body 3, of the rear motor is supplied by the system 30. The two motor rotors are on the one hand mechanically connected together by the coupling 4 and on the other hand electrically connected together by conductors 7 which connect the slip rings 5 and 6. The number of poles of the two motors, $p_1$ and $p_3$, are different from one another. The combination of the two systems to form a single magnetic circuit having only one air gap is achieved by the application of the rule that the common provision of two polyphase windings having different numbers of poles is rendered possible because this arrangement prevents mutual induction between the windings. Also, the possibility of the common maintenance of the two rotating fields is thereby afforded.

The rotor must also be so constructed that it can effect the aforesaid cross-induction. In a construction serving this purpose, the rotor comprises two windings which have the same number of phases and poles as the primary windings, which are then short-circuited through one another with the maintenance of the appropriate phase sequence.

The electric machine thus constructed has many possible applications, mainly because the modern thyristorised current converters afford wide possibilities of fre quency changing for these machines.

In the operation of machines having a tandem rotating-field rotor, it is in some cases possible to utilize a single-phase feed for one of the two feeds, since the second feed is a polyphase feed and this ensures rotation of the associated rotating field. The division of the pulsating field of the single phase side into two oppositely rotating fields takes place in such manner that one of the latter may serve to perform work in tandem field operation, while the other rotating field, although causing some losses, performs no work and is suppressed. This loss is tolerable in the case of low-output machines, and the partial single-phase feed—which in some cases affords great advantages —may therefore be economically employed. The main constructional forms of the electric tandem field machines are motor operation, generator operation and operation as a synchronous transformer.

FIG. 2 illustrates a machine having a tandem rotating field for motor operation and generator operation in an exemplary three-phase circuit. The circuit arrangement according to FIG. 2 differs from that of FIG. 1 in accordance with the invention in that, in the latter, the primary winding 11 of one primary winding system having the common iron core 1 and the number of poles $p_1$ is connected to the supply system 10 either directly or through the current converter 19, while the other primary winding 13 having the number of poles $p_3$ is connected to the supply system 30 either directly or through the current converter 39. It is also possible for the supply systems 10 and 30 to form a common supply system. The two secondary windings 21 and 23 of the rotor winding system having the common iron core 2 are connected together through the conductors 7 by an appropriate choice of phase sequence. An electric machine of this form of construction provides a number of advantageous properties in motor operation. These properties are high power factor, high pull-out torque and in some cases high efficiency.

The motor having a tandem rotating field may operate as a variable-speed induction motor. In this motor, one rotating field may be fed by a constant-frequency supply system, for example by a 50 c.p.s. supply system (FIG. 2, 10–11), while the other side may be fed by a variable-frequency current converter (FIG. 2, 30–39–13). In this case, the range of the speed variation is to some extent limited by the fact that the two frequencies detrimentally affect the operating properties if they are too far apart. The basic value of the chosen varied frequency depends upon the pole numbers chosen and upon the ratio of these pole numbers.

It is also possible for the tandem field machine to be fed on both sides through variable-frequency current converters (FIG. 2, 10–19–11 and 30–39–13). In this case, the ratio of the two rotating fields and of the rotor may be brought to an optimum value for operation, whereby the speed variation of the motor over a wide range is rendered possible. The basic value of the frequency is determined by the pole numbers chosen and by their ratio to one another.

In the foregoing, the "basic value of the frequency" means the minimum frequency which may be employed at the rated voltage. At a lower frequency, the voltage must be reduced in order to maintain a constant flux in the motor. When the basic frequency is exceeded, the voltage cannot be further raised, and the torque therefore decreases in inverse proportion to the frequency with constant load.

In generator operation of the tandem field machine— assuming for the moment that there is a constant-speed drive—one primary winding is connected to the supply system (FIG. 2, 30–13), and the second primary winding performs the function of the exciter connection. The feed thereof must be derived from a current converter (FIG. 2, 10–19–11). The value of the excitation frequency is determined by the two pole numbers, or by their ratio and by the speed.

The speed of the tandem field generator may be raised while retaining the supply frequency by a suitable choice of the excitation frequency and exceeding the limit which is determined by the fixed minimum number of poles and by the supply frequency (for example 3,000 r.p.m. at 50 c.p.s.). From the standpoint of a better utilization of a driving turbine for generator and of the reduction of the dimensions of the generator, this affords almost inestimable economic advantages; particularly in view of continuously rising requirements for the output of turbogenerators. For example, if the generator operates at 50 c.p.s., the normal speed of 3000 r.p.m. is obtained if the supply side is designed with four poles and the excitation side with two poles, and if an excitation frequency of 100 c.p.s. is chosen.

On the other hand, if a supply frequency of 50 c.p.s. is chosen and there are two poles on the supply side, while there are four excitation poles and the excitation frequency is 200 c.p.s., the speed of the turbogenerator is 5000 r.p.m.

The tandem field generator may be employed as a medium-frequency generator by suitable choice of the speed, the number of poles and the excitation frequency (FIG. 2, for example 10–19–11 and 30–13, 10 being a 50 c.p.s. supply system).

The tandem field machine is also suitable for operation as a variable-speed generator (typical cases of such generators are those used in train lighting machines or as a polyphase main generator of diesel-electric locomotives), wherein the number of poles, the excitation frequency and the voltage may be so chosen, or the latter may be so varied (FIG. 2, 10–19–11 and 30–13), that the output frequency and voltage are maintained at a constant value or within narrow limits.

The direction of rotation of the rotating fields in the forms of operation hitherto dealt with have generally been assumed to be the same. However, suitable forms of operation are also possible with oppositely rotating fields, and in such different frequencies are employed. This form of operation may be utilised mainly in the low speed range.

The wide field of application of the tandem field machine is further extended by splitting the iron body and developing it into a plane for use as the known linear motor, in which case the series of slots does not form a closed curve, but extend to form a straight line or a segment of a circle. In this case, the conditions of symmetry must be restored in known manner by varying the number of turns in the outermost slots or by varying the winding step. With the tandem field machine, it is possible to produce a rectilinear movement, or a movement in a limited space on a large diameter, or conversely to convert these movements into an electric signal. Furthermore, a more suitable construction may be employed in which the principle of the tubular motor is utilised as the further development of the linear motor. This principle resides in that the magnetic circuit already developed into a plane is further shaped perpendicularly to its plane along a plane extending through the slots and rolled into the form of a tube in such manner that the slots form a closed circle and the windings are converted to disc windings.

Finally, the tandem field machine may be employed as a static electric machine for the generation of wattless current. By "generation of wattless current" is meant action as a capacitive load in accordance with the principle of a superordinate wattless-current supply system.

For this purpose, the two rotating fields must rotate in opposite directions to one another and the two sides must be fed with the same frequency, preferably with the supply frequency. It can be shown that a fixed position of the rotor must be associated with each of the fields rotating in this way. The fixed rotor, however, means that the air gap may be omitted, i.e. the iron body of the stator and of the rotor may be formed as a single laminated assembly.

The windings are disposed in the closed slots of the iron core. From the practical viewpoint of readier construction, this makes it possible for the iron body to be divided in any manner for the introduction of the coils. For example, the slots may be formed in the outer part of the inner iron body, and the outer iron body may be constructed as a closed yoke without windings.

The winding system as described in the foregoing, however, still does not satisfy all requirements, because the mutual induction of the two primary windings through the rotor—which may be so adjusted by the arrangement of the windings that the induced voltages are opposed to the supply voltage—does not give the required voltage and the system is therefore in the under-excited state. However, since the rotor frequency is identical with the supply frequency, the addition proposed by the invention may be applied, i.e. the secondary windings may be short-circuited, not directly, but through the secondary winding of a polyphase series transformer.

If a voltage is applied to the primary side of the series transformer from the supply system, the secondary voltages thereof are added to the voltages induced in the two tandem field secondary windings, and an overexcitation is thus set up on both sides of the machine. Since the machine operates in the synchronous state, the overexcitation results in a generation of wattless current. There is thus obtained a machine having no air gap and having the character of a transformer, which operates in the synchronous state and may rightly be termed a "synchronous transformer." FIG. 3 illustrates an example of a three-phase construction of the synchronous transformer. The supply system 10 is connected to the primary winding 11 either directly or through the regulator 90, and likewise the primary winding 13 is connected to the supply system 10 directly or through the regulator 90. The terminal connecting members of the primary windings 11 and 13 are so constructed that the two rotating fields set up in the machine rotate in opposite directions.

FIG. 3 differs from FIG. 2 in that the secondary windings 21 and 23 are connected together, not directly, but through the secondary winding of the transformer 8. The relative positions of the windings 11, 13, 21 and 23, the current direction and the phase sequence of the secondary side of the transformer 8 are such that the voltages induced in the primary windings by the secondary windings are opposed to the excitation voltages of the primary windings.

By appropriate choice of the windings 11–21 and 13–23, and of the transformation ratio of the transformer 8, it is possible to ensure a particular wattless current supply even without the use of the regulator 90. If the level of the wattless current supply, or the character thereof, is to be varied, this may be done by varying the voltage by means of the regulator 90, and if desired by varying the phase sequence of the transformer 8.

The synchronous transformer requires windings distributed in slots but their geometrical arrangement is immaterial in the absence of any movement. It is therefore possible to give the iron body or more precisely the lines joining the slots, a shape which is favourable for the construction and which differs from the circular form usual in rotating machines. In the construction of the synchronous transformer, the principle of the split magnetic circuit developed into a plane, as discussed in the foregoing, may also be applied with advantage. In the case of the synchronous transformer, the rectilinear or segmental form is not even essential, and the iron body, or the lines joining the slots, may have any shape which is possible and feasible in practice.

In the case of the synchronous transformers the further development of the iron body in the form of a plane, or the tubular construction is particularly favorable, since the slots then adjoin one another, the windings are brought into the form of disc windings, and the iron body has a shape similar to that of shell-type transformers. This construction affords great advantages from the technological viewpoint.

The described synchronous transformers may be constructed with any longitudinal dimensions which are favorable for construction for relatively high outputs in regard to transport facilities and fitting into the railway clearance.

The electric machines according to the invention may also be so constructed that the iron body is split and developed into a plane or into another surface.

The electric machines according to the invention may also be so constructed that the iron body is developed into a plane and rolled in tube form perpendicularly to this plane along a plane extending through the slots so that the slots adjoin one another and the windings are disc-shaped.

I claim:

1. A double fed polyphase cascade synchronous electric machine comprising a primary winding circuit means including a first primary winding with a first number of poles and a second primary winding with a second number of poles differing from said first number, the number of poles of said first and second primary windings being such to preclude the direct induction of voltages between the respective primary windings, a secondary winding circuit means including first and second interconnected secondary windings, said secondary winding circuit means being adapted to permit one of said primary windings to induce a voltage in the remaining primary winding through said secondary windings, and alternating current power supply means connected to said first and second primary windings, said power supply means providing power to said first and second primary windings to cause said primary winding circuit means to establish two commonly acting fields rotating at different speeds.

2. The electric machine of claim 1, wherein said power supply means provides polyphase power to said first and second primary windings.

3. The electric machine of claim 1, wherein said power supply means provides polyphase power to one of said primary windings and single phase power to the remaining primary winding.

4. The electric machine of claim 2, wherein said supply means provides polyphase power of a first frequency to said first primary winding and polyphase power of a second frequency different from said first frequency to said second primary winding.

5. The electric machine of claim 3, wherein said power supply means provides polyphase power of a first frequency to one of said primary windings and single phase power of a second frequency to the remaining primary winding.

6. The electric machine of claim 1, wherein said power supply means includes a first power source, a second power source, a first variable current converter means connected between said first power source and said first primary winding to vary the power frequency from said first power source and a second variable current converter means connected between said second power source and said second primary winding to vary the power frequency from said second power source.

7. The electric machine of claim 1, wherein said primary winding circuit means includes a first core supporting said first and second primary windings, said secondary winding circuit means including a second core spaced from said first core to form a unitary magnetic circuit having a single air gap, said second core supporting said first and second interconnected secondary windings to provide a rotor.

8. The electric machine of claim 1, wherein said primary winding means and said secondary winding means are mounted upon a single core member, said primary winding means operating with said alternating current supply means to set up two fields rotating one against the other in opposite directions, and said secondary winding means including means including transformer means interconnecting said secondary windings, said transformer means including transformer primary windings connected to said alternating current supply means and transformer secondary windings connected between said first and second secondary windings.

9. The electric machine of claim 8, wherein said alternating current supply means constitutes a polyphase supply source, said first and second primary and secondary windings constituting polyphase windings and said transformer means being formed by a polyphase series transformer.

10. The electric machine of claim 1, wherein said alternating current supply means constitutes a polyphase supply source, said first and second primary and secondary windings constituting polyphase windings.

11. The electric machine of claim 7, wherein the frequency of power provided by said alternating current power supply means and the number of poles of said primary winding circuit means results in a speed higher than the limit speed normally resulting from such frequency of power in generator operation of the machine.

References Cited

UNITED STATES PATENTS

| | | | |
|---|---|---|---|
| 733,341 | 7/1903 | Steinmetz | 318—225 |
| 2,664,534 | 12/1953 | Noodleman et al. | 318—225 |
| 2,894,190 | 7/1958 | Alger | 318—225 XR |
| 2,896,143 | 7/1959 | Bekey | 318—231 XR |

ORIS L. RADER, Primary Examiner

G. Z. RUBINSON, Assistant Examiner

U.S. Cl. X.R.

318—225, 231